United States Patent Office 3,344,104
Patented Sept. 26, 1967

3,344,104
ALDEHYDE AND KETONE HEAT-SENSITIVE CURABLE ORGANOSILICON COMPOSITIONS
James Franklin Hyde, Midland, Mich., assignor to Dow Corning Corporation, Midland, Mich., a corporation of Michigan
No Drawing. Filed Mar. 25, 1963, Ser. No. 267,769
39 Claims. (Cl. 260—32.8)

This invention relates to a new curing system for organosilicon compositions.

Present day organosilicon compositions are in large part those that are formable and curable. By this is meant that the compositions can be formed into a desired configuration and thereafter cured in the desired configuration so that this becomes the natural condition of the material as a result of these operations. Both elastomeric and resinous organosilicon compositions are of this type, their names being a rather apt description of the cured rather than the uncured materials.

The presently known curing methods for organosilicon compositions can be placed roughly into two classes; namely, room temperature curing, wherein curing occurs without added heat, and heat activated curing, wherein external heat is necessary, usually to at least a certain threshold temperature. The first named method is illustrated by such as those methods contained in U.S. Patents 2,833,742, 2,843,555, 2,902,467, 2,934,519 and 2,999,077. The second named method is illustrated by such curing agents as heat alone, air or oxygen (wherein curing is actually a partial oxidation of the composition), organic peroxides such as benzoyl peroxide, t-butylperbenzoate and di-t-butyl peroxide, sulfur and/or organosulfur compounds, either with or without accelerators, as commonly used as well in the organic rubber field, the heat activated curing systems such as are described in copending application Serial No. 202,974, filed June 18, 1962, which briefly comprises a system involving the intracondensation of silicon-bonded hydrogen to an aliphatic unsaturated group on silicon catalyzed by platinum, inhibited from reacting below a threshold temperature by benzotriazole, and heat-sensitive curing agents such as cyanoguanidine, disclosed in copending application Serial No. 131,987, filed August 17, 1961, and urea, disclosed in copending application Serial No. 254,451, filed January 28, 1963. The method disclosed in this invention is of the heat-activated type.

It is an object of the present invention to provide a new and useful heat activated curing system for organosilicon compounds. Another object of this invention is to provide a curing system that can be incorporated into an organosilicon composition that is inert at normal temperatures. A further object is to provide a curing system that is not inhibited by air or the usual components of the atmosphere. Still another object is to provide a heat activated cure to an organosilicon composition that imparts good stability to the cured system. These and other objects will be apparent from the following description.

This invention relates to a composition of matter comprising (1) an organosilicon compound containing silicon-bonded hydroxyl radicals, there being in addition an average of up to 2.1 groups per silicon atom selected from the group consisting of hydrogen atoms, monovalent hydrocarbon radicals, monovalent halohydrocarbon radicals and cyanoalkyl radicals, the remaining valences of the silicon atoms being satisfied by selection from the group consisting of divalent oxygen atoms, divalent hydrocarbon radicals, divalent hydrocarbon ether radicals and haloarylene radicals, there being an average of at least two silicon-bonded hydroxyl radicals per molecule of (1), (2) an organosilicon compound containing an average of from 1 to 4 groups per silicon atom selected from the group consisting of —OR radicals and —R' substituents wherein R is selected from the group consisting of monovalent hydrocarbon radicals, monovalent halohydrocarbon radicals and —CH$_2$CH$_2$OR'' radicals wherein R'' is an alkyl radical of from 1 to 6 inclusive carbon atoms and R' is selected from the group consisting of hydrogen atoms, monovalent hydrocarbon radicals, monovalent halohydrocarbon radicals and cyanoalkyl radicals, there being present in organosilicon compound (2) an average of at least two —OR radicals per molecule, the remaining valences of the silicon atoms of the said organosilicon compound being satisfied by selection from the group consisting of divalent oxygen atoms, divalent hydrocarbon radicals, divalent hydrocarbon ether radicals and haloarylene radicals, and (3) a carbonyl compound.

The composition of this invention is stable for an indefinite period of time at substantially normal temperatures. At temperatures above about 60° C. the system becomes active so that, held at these elevated temperatures for a sufficient time, the composition cures, i.e. cross-linking takes place in the system.

Component (1) of this invention contains hydroxyl radicals. There should be, as stated above, an average of at least two silicon-bonded hydroxyl radicals per molecule of (1). There can be more than this average amount, without upper limit, although the more hydroxyl radicals that are present the greater can be the crosslink density in the cured system. This latitude in the amount of hydroxyl radicals is, of course, a parameter of control over the cure density of the particular matrix in which this curing system is employed.

The monovalent substituents in organosilicon compound (1) can include hydrogen and any monovalent hydrocarbon radical such as alkyl such as methyl, ethyl, t-butyl, octadecyl and myricyl; unsaturated aliphatic such as vinyl, allyl, methallyl, decenyl, butadienyl and propargyl; cycloaliphatic such as cyclobutyl, cyclopentenyl and cyclohexadienyl; aralkyl such as benzyl; alkaryl such as cresyl and xylyl; and aryl such as phenyl, xenyl, naphthyl and anthracyl. Also included are halogenated derivatives of the above said radicals such as chloromethyl, dibromodecenyl, dichlorocyclopentyl, difluorobenzyl, trifluorotolyl, pentachlorophenyl and 3,3,3-trifluoropropyl. Also included are cyanoalkyl radicals such as betacyanoethyl, gamma-cyanopropyl, gamma-cyanohexyl and omega-cyanooctadecyl. While any such radical as illustrated above is operative in this component of this invention, preferred radicals because of their more ready commercial availability include methyl, ethyl, propyl, vinyl, allyl, benzyl, phenethyl, 2-phenylpropyl, tolyl, phenyl, xenyl, naphthyl, chloromethyl, 3,3,3-trifluoropropyl, dichlorophenyl and chlorophenyl. In specifying the preferred radicals above, it is not intended, nor should it be construed, that the operative monovalent radicals of component (1) are limited to these, or even to those listed earlier. The above radicals are representative of the radicals operative in this component. When there is silicon-bonded hydrogen in this component, it is preferred that there be no more than one said hydrogen atom on any one silicon atom.

As stated above, any remaining silicon valences of organosilicon compound (1) are satisfied by selection from divalent oxygen atoms and/or divalent organic radicals as above. Examples of divalent hydrocarbon radicals include such as methylene, ethylene, butylene, butenylene,

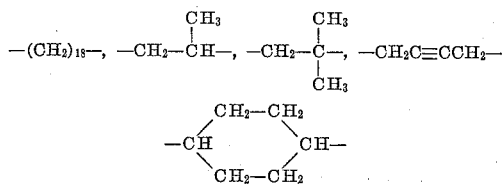

phenylene, diphenylene, di(phenylene)methane, benzylene, xylylene and anthracylene. Examples of hydrocarbon ether radicals include such as —CH₂CH₂OCH₂CH₂—,

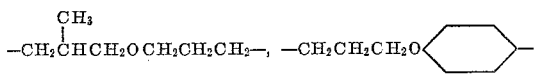

and

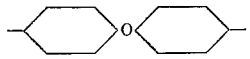

Haloarylene radicals include such as

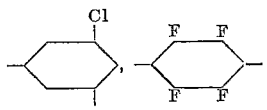

and

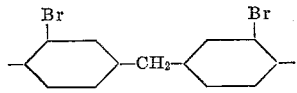

Any of the above illustrated divalent linkages can be present in component (1). However, where the average number of silicon atoms per molecule is greater than three, it is preferred, when use the cured composition will include both extremely high and extremely low temperature exposure, especially the latter, that at least 50 percent of the said divalent linkages be oxygen. This is not necessary, however, particularly when component (1) is a cyclic material.

Component (1) can be a linear, branched, partially crosslinked or esentially gelled organosilicon compound, having an average molecular weight ranging from about 100 to well over several million, being in the case of an essentially gelled material of undeterminable quantity. The hydroxyl radicals present in the composition (being silicon-bonded) can be attached to any silicon atom of the component, provided only that an average of at least two said radicals per molecule of (1) are available for the curing reaction. Component (1) can be a polymer, copolymer or mixture of polymers and/or copolymers. The monovalent substituents can be alike or different, there being in the latter case from two to as many as desired kinds of monovalent substituents therein. In addition, the divalent groups can be of one or more kinds.

The organosilicon compounds that can function as (1) can all be made by methods already well known in the organosilicon field. Recital of these methods herein would be redundant. The functioning of component (1) is completely independent of the method by which it is made.

Component (2) of this invention contains an average of at least two —OR radicals per molecule. There can be more than this number, up to four per silicon atom (this last being an orthosilicate) as desired. An increase in the amount of the said —OR radicals leads to a tighter cure of the composition, so that this parameter also allows a measure of control of cure density. For maximum utility of both hydroxyl radicals in component (1) and —OR radicals in component (2), the molar quantity of each in a given composition can be closely matched, if desired, but this is not necessary. Care should be exercised, however, to insure that there is not a large excess (on the order of 5- or 6-fold) of one type radical over the other, although an excessive amount of —OR radicals is not fatal in that these are convertible upon hydrolysis to hydroxyl radicals.

The R radical of radical —OR of component (2) can be any monovalent radical as stated above. Thus, the said radical can be, for example, aliphatic such as methyl, ethyl, butyl, octadecyl, vinyl, allyl, propargyl, butadienyl and ethynyl; cycloaliphatic such as cyclobutyl, cyclopentenyl and cyclohexadienyl; aromatic such as benzyl, phenethyl, tolyl, xylyl, phenyl, xenyl, naphthyl and anthracyl; halogenated monovalent hydrocarbon such as 2,2,2-trifluoroethyl, 4-chlorobutenyl, 2,2-dibromocyclopentyl and chlorophenyl; and radicals of the formula —CH₂CH₂OR″ where R″ is methyl, ethyl, propyl, butyl, amyl and hexyl, both straight and branched chain.

Substituent R′ can be hydrogen or any monovalent radical as stated above. Thus, radical R′ can be, for example, aliphatic such as methyl, ethyl, propyl, butyl, octadecyl, myricyl, vinyl, allyl, methallyl, decenyl, butadienyl, butenynyl and propargyl; cycloaliphatic such as cyclobutyl, cyclopentenyl and cyclohexadienyl; aralkyl such as benzyl, phenethyl, 2-phenylpropyl and xenylamyl; alkaryl such as tolyl, mesityl, xylyl, propylphenyl and trimethylnaphthyl; aryl such as phenyl, xenyl, naphthyl and anthracyl; halogenated hydrocarbon such as chloromethyl, bromobutenyl, dichlorocyclopentyl, 3,3,3-trifluoropropyl, chlorophenyl, difluorobenzyl, trifluorotolyl and dibromonaphthyl; and cyanoalkyl such as beta-cyanoethyl, gamma-cyanopropyl, delta-cyanohexyl and omega-cyanooctadecyl. When there is silicon-bonded hydrogen in this component it is preferred that there be no more than one such hydrogen atom on any one silicon atom. Preferred R′ radicals are methyl, ethyl, vinyl, allyl, phenyl, xenyl and 3,3,3-trifluoropropyl, as these radicals are more readily available commercially.

Component (2) of this invention can be a monomer; that is, it can be a silane. Thus, component (2) can be an orthosilicate of the formula (RO)₄Si, or it can be of the formula R′Si(OR)₃ or R′₂Si(OR)₂. Component (2) can also be a polymer; that is, there can be more than one silicon atom per molecule of (2). In such case the linking substituents between these silicon atoms can be divalent oxygen or any divalent organic radical as stated above. The divalent organic radicals can be hydrocarbon such as —CH₂—, —CH₂CH₂—, —(CH₂)₁₈—,

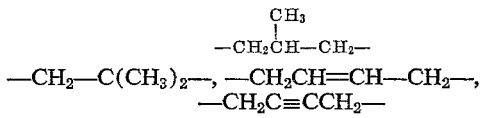

phenylene, diphenylene, di(phenylene)methane, benzylene, xylene, and naphthylene; hydrocarbon ether such as —CH₂CH₂OCH₂CH₂—;

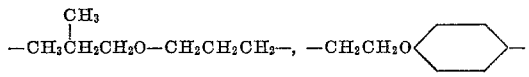

and

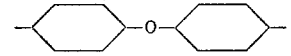

and haloarylene such as

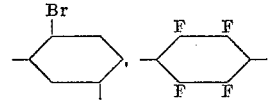

and

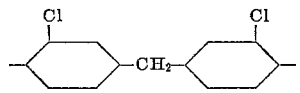

While oxygen and any of the radicals as illustrated above can be employed in polymeric organosilicon compounds, preferred linkages include oxygen, methylene, ethylene, propylene and paraphenylene. Preferably, at least half of the said divalent linkages are oxygen when component (2) contains more than three silicon atoms, but this is not necessary, particularly if (2) is cyclic. The most common, and most preferred, divalent link is oxygen. The polymeric compositions (2) are often made by the partial hydrolysis of the monomeric silanes, either in single specie or mixtures thereof. These partial hydrolyzates can be liquids or solids. Included in the mixture to be hydrolyzed can be components of the formula

wherein R and R' have the meaning already given, X is a divalent organic radical as already defined, and $a$ and $b$ are each independently 0, 1 or 2, preferably 0 or 1. The hydrolysis or cohydrolysis method is only one of several ways by which this component can be made, as is well known in the art.

Component (3) of this invention is a carbonyl compound. For the purpose of this invention, and within the accepted definition of organic chemistry, a carbonyl compound is one containing the

linkage wherein X is carbon or hydrogen. Thus, component (3) can be an aldehyde or a ketone. Since more than one aldehyde or ketone can be present to function as component (3), it follows that a mixture containing both one or more aldehydes and one or more ketones can function as component (3) of this reaction. Any aldehyde and/or ketone will function as component (3) of this invention. This includes aldehydes such as formaldehyde, acetaldehyde, propionaldehyde, butyraldehyde, valeraldehyde, capronaldehyde, heptaaldehyde, nonyl aldehye, stearaldehyde, glycolic aldehyde, glyoxal, methylglyoxal, glyceric aldehyde, acrolein, crotonaldehyde, alpha,beta-dimethylacrolein, furfural, benzaldehyde, tolualdehyde, cinnamaldehyde, chlorobenzaldehyde, nitrobenzaldehyde, aminobenzaldehyde, salicylaldehyde, hydroxybenzaldehyde, p-dimethylaminobenzaldehyde, dichlorobenzaldehyde, bromobenzaldehyde, p-thymolaldehyde, N-methylformanilide, anthroaldehyde, vanillin, 2 - hydroxy - 3,5,6 - trimethylbenzaldehyde, veratraldehyde, piperonal, gentisaldehyde, protocatechualdehyde, 7-phenylheptatrienal, naphthaldehyde, acetoxybutoxyaldehyde, diethyl-alpha-formyl succinate, chloral, and organosilicon derivatives such as $(CH_3)_3Si(CH_2)_3CHO$,

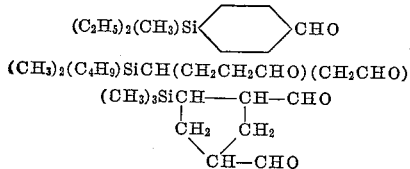

and

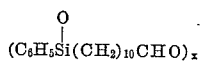

where $x$ is greater than 1. In addition, compounds which of themselves are not aldehydes, but which upon heating liberate an aldehyde, such as trioxane, paraldehyde and polyoxymethylenes, are especially useful in this invention.

Any ketone can be employed, examples of which include acetone, methyl ethyl ketone, methyl n-propyl ketone, diethyl ketone, 2-hexanone, 3-hexanone, 7-octadecanone, methyl t-butyl ketone, dipropyl ketone, dibutyl ketone, stearone, chloroacetone, dichloroacetone, trichlorotrifluoroacetone, diacetal, acetylacetone, mesityl oxide, phorone, isophorone, cyclohexanone, acetophenone, propiophenone, gallacetophenone, phloroacetophenone, dibromoacetophenone, acetomesitylene, benzophenone, chlorobenzophenone, nitrobenzophenone, menthone, camphor, methyl benzyl ketone, Michler ketone, 10-methyl decalone-2, 2,4,5-trimethyl-4-dichloromethyl- $\Delta^{2,5}$-cyclohexadieneone-1, 10-dichloromethyl-2-keto-$\Delta^{1,9;3,4}$-hexahydronaphthalene, and organosilicon compounds containing keto functions such as

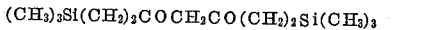
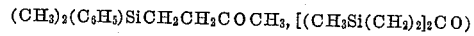
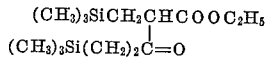
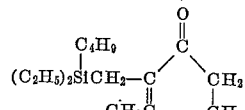
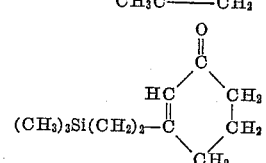
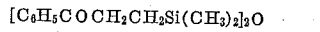
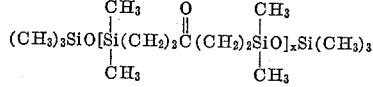

and

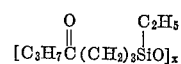

$x$ in the last two formulas being a whole number.

Preferred aldehydes and/or ketones are those that are high boiling. Generally, aldehydes impart a greater rate of cure to the system than ketones but, as is the case in all organic and organosilicon compounds, the nature of the ketone or aldehyde has a bearing on the "activity" of the said curing agent. Thus, it is possible through judicious choice of the curing agent to select a curing time at a given elevated temperature well suited to the end use in mind.

The amount of aldehyde or ketone used in the composition of this invention is unimportant. Provided any of either compound is present some curing will occur when the composition is heated above about 70° C. Curing by the interaction of the silicon-bonded hydroxyl radicals of component (1) and the silicon-bonded —OR radicals of component (2), the said interaction induced by the aldehyde or ketone, appears to be the mechanism. If this is so, it follows logically that the carbonyl compounds therefore cause the above said interaction to proceed by the simple expedient of "trapping" the ROH by-product of the said interaction. (The addition of an alcohol to a carbonyl radical is known to proceed in organic chemistry.) The feasibility of the above-postulated mechanism is enhanced by the fact that full cure is obtained in a system of the present kind when at least one mol of carbonyl compound is present per mol of ROH product that can form. Thus, whether the above mechanism be correct or not, and the inventor does not wish to be held to the above said mechanism, it is preferred that there be present at least one mol of carbonyl radical per mol of silicon-bonded hydroxyl radical of (1) or of silicon-bonded —OR radical of (2), whichever is less. This is not necessary, however, for as already stated above, some curing occurs when less than this amount is present, and less than the potential amount of curing attainable in a given matrix may be desired and also desirable. More than the mol-per-mol amount of carbonyl radical as defined above can be employed, but this is not necessary, and is wasteful in many cases. When the carbonyl compound is volatile and the curing conditions would allow slow escape of the said compound, it may be advisable, when complete cure is desired, to employ an excess of this volatile material, although a preferred condition would be to switch to a less volatile compound.

The composition of this invention is obtained by mixing the desired quantity of each of the three components. The order of mixing is completely unimportant. Thus, components (1) and (2) can be premixed and thereafter component (3) added; or components (1) and (3) premixed and (2) added; or (2) and (3) premixed and (1) added; or all three can be admixed at one time. Because the composition is stable at ordinary temperatures, there is no need, and thus no advantage, to omitting one of the components until just before desiring to effect the cure, but this can be done if desired.

An especially useful modification of the instant composition is to premix components (2) and (3), preferably in such an amount that the molar quantities of —OR radicals in (2) and of carbonyl radicals in (3) are substantially the same, so that this premixed combination can be added to a component (1) in such an amount that there is at least one —OR radical (and therefore also are carbonyl radicals) per —OH radical of component (1). This combination would be especially useful as a "curing agent" for the heat activated curing of silicone resins and rubbers which are, or are based on, hydroxylated polysiloxanes, which constitutes the great bulk of commercial silicone resins and rubbers today.

This invention also relates to a composition comprising (1) an organopolysiloxane of the unit formula

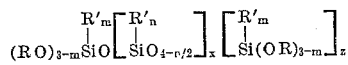

wherein R and R' have the meanings given above, $m$ is an integer of from 0 to 1 inclusive, $n$ has an average value of up to 2 inclusive, $z$ has an average value of from 1 to 3 inclusive, $x$ has an average value of at least 5, $n+z=3$, in which organo-silicon compound up to fifty percent of the divalent siloxane oxygen atoms can be replaced by divalent radicals selected from the group consisting of divalent hydrocarbon radicals, divalent hydrocarbon ether radicals and haloarylene radicals, and (2) a carbonyl compound.

The critical feature of component (1) above is that it contains an average per molecule of at least two radicals of the structure (RO)$_3$Si— or

It has been found that when two or more —OR groups are on any one silicon atom that at least one of them appears to be susceptible to reaction with a carbonyl compound. Once again, the above conjecture is based on observation of the fact that when compositions as defined above are heated with a carbonyl compound above about 60° C., curing of the said composition takes place.

The remaining siloxane units of component (1) above can be SiO$_2$ units or R'SiO$_{3/2}$ units or R'$_2$SiO units. The R' radicals can be, as defined above, aliphatic such as methyl, ethyl, butyl, octadecyl, myricyl, vinyl, allyl, decenyl, butadienyl and propargyl; cycloaliphatic such as cyclobutyl, cyclopentenyl and cyclobutadienyl; radicals containing aromatic nuclei, such as phenyl, xenyl, naphthyl, anthracyl, fluorenyl, pyrenyl, indenyl, benzyl, phenethyl, tolyl and ethylphenyl; halogenated derivatives of the above such as chloromethyl, 3,3,3-trifluoropropyl, 4-bromobutenyl, dichlorocyclopentyl, perchlorophenyl, difluorobenzyl and hexafluoroxylyl; and cyanoalkyl such as beta-cyanoethyl, gamma-cyanobutyl and omega-cyanooctadecyl. Preferred radicals include methyl, ethyl, vinyl, allyl, propargyl, phenyl, cyclohexyl, xenyl, chloromethyl, chloro- and di-chlorophenyl and 3,3,3-trifluoropropyl.

Preferably, component (1) contains mainly R'SiO$_{1.5}$ and R'$_2$SiO units in greater quantity than SiO$_2$ units. Most preferably, there are essentially no SiO$_2$ units in component (1). However, the average value of $n$ in the R$_n$SiO portion of component (1) can be 0 if desired.

As stated above, up to 50 percent of the siloxane oxygen atoms can be replaced by the above said divalent organic radicals. Examples of the said divalent radicals include hydrocarbon such as methylene, ethylene, octadecylene, cyclohexylene, butenylene, butynylene, benzyldecylene, phenylene, naphthylene, xylylene and biphenylene; hydrocarbon ether such as —CH$_2$CH$_2$OCH$_2$CH$_2$—, —CH$_2$CH(CH$_3$)OCH$_2$OH$_2$CH$_2$—,

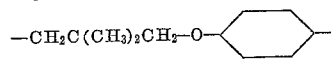

and

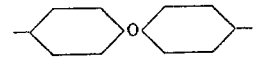

and haloarylene such as

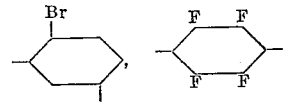

and

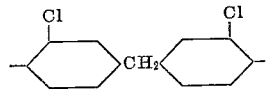

In the above composition it is preferred that substantially none to none of the siloxane oxygen atoms be replaced.

Component (2) is a carbonyl compound. As defined earlier, this includes organic and organosilicon aldehydes and ketones. A suitable number of examples of each class of compound is given earlier.

This system cures when heated at a temperature above about 60° C. As with the system earlier discussed, the higher the temperature above this minimum, the more rapid the cure. Here again, as before, aldehydes are generally faster than equivalent ketones, but this is not to say that there cannot be ketones faster than some aldehydes.

Of particular interest in the organosilicon elastomer field is a composition patterned after the above said system in which component (1) is an organopolysiloxane of the average formula

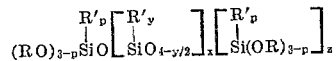

wherein R and R' have the meanings already stated, $x$ has an average value of at least 7, $p$ has an average value of from 0 to 1 inclusive, $y$ has an average value of from 1.99 to 2 inclusive, $z$ has an average value of from 1 to 1.01 inclusive and the sum of $y+z$ is 3.

The above composition is an essentially diorganopolysiloxane that is endblocked by

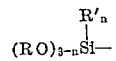

groups. This composition is disclosed in copending application Serial No. 145,455, dated October 16, 1961, which application is hereby incorporated into this specification by reference.

Compositions comprising the above essentially diorganopolysiloxane and carbonyl compound (aldehyde or ketone) provide an excellent silicone rubber stock base; i.e., a material which vulcanizes (or cures) to a silicone rubber. Optionally, fillers such as silicas, metal oxide and carbonate and silicate powders, asbestos, fluorocarbon polymer powders, etc., can be added as extenders and/or reinforcing agents. The composition, with or without these and other ingredients optionally used in organosilicon rubbers, is especially useful in that fluid compositions are possible as well as substantially non-flowing materials, all of which cure on exposure to heat above about 60° C., virtually independent of the environment. This is to say that the cure is effected in closed or open system in the presence or absence of air or components thereof.

The composition of this invention can contain, in addition to the recited components, other materials such as extenders (fillers) such as cork, wood flour, asbestos, silica, crushed quartz, fume silica, silica aerogel, silica xerogel, alumina, aluminum silicate, zirconium silicate, magnesium oxide, zinc oxide, talc, diatomaceous earth, iron oxide, calcium carbonate, clays, etc., normally used in silicon compositions. In addition, special additives such as compression set additives, antioxidants, pigments, flame retardants, etc. can also be added, provided these do not interfere with the above described curing reaction. Preferred additives include the silicas and metal oxides commonly employed in organosilicon compounds as reinforcing fillers and/or pigments.

The present composition is especially useful for curing organosilicon compositions to coherent solids. Foaming agents activated by heat can be employed to provide foaming action simultaneously with the cure, providing a means to a coherent foam or sponge. Thus, solids and foams or sponges can be made. The essential feature of the present composition is that it is stable at normal temperatures, but is activated at elevated temperatures to form a cured silicone.

The following examples are illustrative only and should not be construed as limiting the invention which is properly delineated in the appended claims. All viscosities are measured at 25° C. All parts are by weight unless otherwise specified.

*Example 1*

About two parts of polyoxymethylene were added to a mixture of 100 parts of a hydroxyl endblocked dimethylpolysiloxane having a viscosity of 2,000 cs. and 3 parts of ethylpolysilicate. The resulting mixture was placed in a 110° C. oven overnight. The mixture had in this time hardened to a rubbery solid.

*Example 2*

A mixture was made of 25 grams of a hydroxyl endblocked 10,000 cs. dimethylpolysiloxane and 2 grams of ethylpolysilicate. To five grams of this mixture were added two drops of methyl isobutyl ketone, and the mixture placed in a small vial around a small copper coil. This entire assembly was heated 3 hours at 150° C., during which time the sample cured completely throughout.

To ascertain that this is not an oxidation or thermally induced reaction, a 5 gram portion without ketone was placed in a flat dish and heated three hours at 150° C. It was essentially unchanged by this treatment. This shows that (1) the curing reaction is caused by the ketone and (2) the reaction is independent of atmosphere; that is, air is neither a necessity nor an inhibitor.

Acetophenone was used in place of the methyl isobutyl ketone above. The sample cured as before. Methylcyclohexanone also caused curing of a sample.

*Example 3*

A mixture of 100 parts of hydroxy endblocked 10,000 cs. dimethylpolysiloxane and 5 parts of ethylpolysilicate was prepared. To separate samples of this mixture were added each isophorone, octanone, trioxane and heptaldehyde. Each of the four samples were heated three hours at 150° C. in a closed container. All samples cured to a hard solid. The sample containing the heptaldehyde cured faster than the others.

Samples of the above heated in thin films in open containers at 150° C. did not cure completely, due to the vaporization of the carbonyl compounds.

*Example 4*

A mixture of 100 parts of a hydroxyl endblocked 2,000 cs. dimethylpolysiloxane, 5 parts of ethylpolysilicate, about 1 part of camphor and about 1 part of heptaldehyde was heated five hours at 110° C. The mixture cured in this time to a flexible solid.

A similar sample was made except the hydroxyl endblocked dimethylpolysiloxane had a viscosity of 7,000 cs. This sample cured in 3 hours at 110° C.

*Example 5*

A mixture of 150 grams of a hydroxyl endblocked 7,000 cs. dimethylpolysiloxane and 7 grams of ethylpolysilicate was prepared. To a portion of this was added a small amount of benzaldehyde. This mixture was divided, part into a small vial and the remainder into an open dish. The vial was capped securely, and both samples placed in an oven operating at 110° C. Overnight the material in the closed vial cured to a non-tacky solid, while that in the open dish did not cure because the benzaldehyde was lost by vaporization.

*Example 6*

This example illustrates that the carbonyl compound alone will not cure a hydroxyl containing organosilicon polymer. One hundred parts by weight of a 2,000 cs. hydroxyl endblocked dimethylpolysiloxane were mixed thoroughly with about 4 parts of camphor. This mixture was heated 24 hours at 150° C. At the end of this time there was no sign of condensation or bodying; i.e., the sample had not cured in the slightest.

The evidence of this example coupled with the evidence of the last part of the previous example clearly shows that both a carbonyl compound and a compound containing ≡SiOR radicals are necessary to cure hydroxylated organosilicon polymers.

*Example 7*

Ten drops of cyclohexanone were mixed thoroughly with 10 g. of an 11,000 cs. $(CH_3O)_3Si$ endblocked dimethylpolysiloxane fluid. Part of this mixture was heated overnight (about 16 hours) in a loosely capped vial. At the end of this time the sample was thicker but not completely cured. A second portion was heated 3 hours at 150° C. During this time it cured completely to a firm rubbery gel.

*Example 8*

Equivalent results are obtained when the five parts of ethylpolysilicate of Example 4 is replaced by the amounts shown of the following compounds:

(a) 2 parts of methylorthosilicate
(b) 6 parts of $C_{18}H_{37}Si(OCH_2CH_2OC_4H_9)_3$
(c) 7 parts of a polysilicate consisting essentially of 90 mol per cent $SiO_2$ units,
7 mol percent $CF_3CH_2CH_2SiO_{1.5}$ units, and
3 mol percent of $(CF_3CH_2O)_2SiO$ units (d) 12 parts of a liquid partial hydroylsis product of a mixture containing 20 mol percent of $(C_2H_5O)_3SiCH_2CH_2Si(OCH_2CH_3)_3$ units,
15 mol percent of

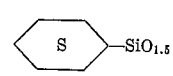

units,
5 mol percent of $CH_2$=$CHCH_2SiO_{1.5}$ units,
15 mol percent of $SiO_2$ units,
5 mol percent of $(C_6H_5)_2SiO$ units,
10 mol percent of

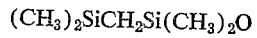

units,
25 mol percent of $C_6H_5C_6H_4SiO_{1.5}$ units and
5 mol percent of $CNCH_2CH_2CH_2SiO_{1.5}$ units.

*Example 9*

Equivalent results are obtained when any of the following organosilicon polymers are substituted for the dimethylpolysiloxane of Example 5.

(a) A hydroxyl-endblocked essentially diorganopolysiloxane having a viscosity of 100,000 cs., containing 20 mol percent of units of the formula $(CH_3)_2SiCH_2Si(CH_3)_2O$ 79.8 mol percent of cyanoethylmethylsiloxane units and 0.2 mol percent of methylvinylsiloxane units, (b) A hydroxyl-endblocked essentially diorganosiloxane polymer having a Williams plasticity of 0.110", containing 95 mol percent of dimethylsiloxane units, 4.86 mol percent of diphenylsiloxane units and 0.14 mol percent of allylmethylsiloxane units, (c) A hydroxyl-endblocked 3,3,3 - trifluoropropylmethylpolysiloxane having a viscosity of 500,000 cs., (d) A mixture of high polymer gums, containing 10 percent by weight of a hydroxylated copolymer containing 75 mol percent of dimethylsiloxane units, 20 mol percent of methylhydrogensiloxane units and 5 mol percent monoethylsiloxane units, and 90 percent by weight of a hydroxylated copolymer containing 75 mol percent of dimethylsiloxane units, 2 mol percent of octadecylmethylsiloxane units, 20 mol percent of units of the formula C₆H₅(CH₃)SiC₆H₄Si(C₆H₅)(CH₃)O, 2 mol percent of cyclohexylethylsiloxane units, 0.9 mol percent of butadienylmethylsiloxane units, 0.04 mol percent of monodecylsiloxane units, 0.04 mol percent of phenylethyl-3,3,3,-trifluoropropylsiloxane units and 0.02 mol percent of SiO₂ units.

*Example 10*

When any of the following carbonyl compounds are substituted either singly or in any combination for the acetophenone of Example 2, curing of the composition will occur: capronaldehyde, stearaldehyde, glyoxal, acrolein, furfural, tolualdehyde, chlorobenzaldehyde, nitrobenzaldehyde, p-dimethylaminobenzaldehyde, N-methylformanilide, vanillin, piperonal, chloral, C₆H₅(CH₃)₂SiC₆H₄CHO

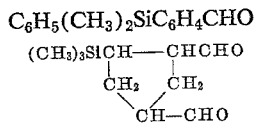

trioxane, paraldehyde, chloroacetone, pentafluorochloroacetone, acetylacetone, mesityl oxide, phorone, propiophenone, dibromoacetophenone, menthone, Michler ketone, (CH₃)₃Si(CH₂)₂COCH₂CO(CH₂)₂Si(CH₃)₃ and

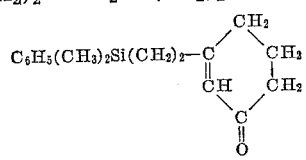

*Example 11*

Resins are formed when the following materials are used in place of the hydroxylated dimethylpolysiloxane of Example 4.

(a) A hydroxylated monophenylpolysiloxane high polymer.

(b) A hydroxylated liquid hydrolyzate containing 50 mol percent of (CH₃)₂SiO units, 25 mol percent of C₃H₇SiO₁.₅ units and 25 mol percent of

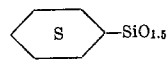

units, made by cohydrolysis of the appropriate halosilanes, (c) A mixture of 75 weight percent of a 10,000 cs. fluid copolymer containing 85 mol percent of phenylmethylsiloxane units and 15 mol percent of monophenylsiloxane units, and 25 weight percent of a 5,000 cs. fluid copolymer of 80 mol percent propylmethylsiloxane units and 20 mol percent of units of the formula

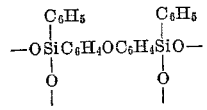

which siloxane is hydroxyl-endblocked.

*Example 12*

When a solution of 100 parts of a polyhydroxylated polysiloxane containing 60 mol percent of phenylsiloxane units, 30 mol percent of propylsiloxane units, 5 mol percent of ethylmethylsiloxane units and 5 mol percent of SiO₂ units, the said siloxane being a solid at room temperature 5 parts of a fluid essentially of the average formula

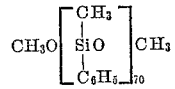

in 200 parts of methylisobutyl ketone is painted onto a wood panel and the bulk of the ketone allowed to evaporate, and thereafter the coated wood panel is heated several hours at 110° C., a cured resinous coating is obtained on the wood panel.

*Example 13*

Curing occurs when a mixture of 100 parts of a 40 cs. hydroxyl-endblocked dimethylpolysiloxane, 10 parts of diphenyldimethoxysilane and 15 parts of methyl isobutyl ketone are refluxed overnight, as evidenced by an increase in viscosity of the fluid.

That which is claimed is:

1. A composition of matter consisting essentially of (1) an organosilicon compound containing silicon-bonded hydroxyl radicals, there being in addition an average of up to 2.1 groups per silicon atom selected from the group consisting of hydrogen atoms, monovalent hydrocarbon radicals, monovalent halohydrocarbon radicals and cyanoalkyl radicals, the remaining valences of the silicon atoms being satisfied by selection from the group consisting of divalent oxygen atoms, divalent hydrocarbon radicals, divalent hydrocarbon ether radicals and haloarylene radicals, there being an average of at least two silicon-bonded hydroxyl radicals per molecule of (1), (2) an organosilicon compound containing an average of from 1 to 4 groups per silicon atom selected from the group consisting of —OR radicals and —R′ substituents wherein R is selected from the group consisting of monovalent hydrocarbon radicals, monovalent halohydrocarbon radicals and —CH₂CH₂OR″ radicals wherein R″ is an alkyl radical of from 1 to 6 inclusive carbon atoms and R′ is selected from the group consisting of hydrogen atoms, monovalent hydrocarbon radicals, monovalent halohydrocarbon radicals and cyanoalkyl radicals, there being present in organosilicon compound (2) an average of at least two —OR radicals per molecule, the remaining valences of the silicon atoms of the said organosilicon compound being satisfied by selection from the group consisting of divalent oxygen atoms, divalent hydrocarbon radicals, divalent hydrocarbon ether radicals and haloarylene radicals, and (3) a carbonyl compound selected from the group consisting of aldehydes and ketones.

2. A composition of matter consisting essentially of (1) a hydroxyl endblocked essentially diorganopolysiloxane having a viscosity of at least 25 cs. at 25° C. wherein the organic radicals attached thereto are selected from the group consisting of hydrogen atoms, monovalent hydrocarbon radicals, monovalent halohydrocarbon radicals and cyanoalkyl radicals, (2) a silicate selected from the group consisting of (a) silanes of the formula R′ₙSi(OR)₄₋ₙ wherein R′ is selected from the group consisting of hydrogen atoms, monovalent hydrocarbon radicals, monovalent halohydrocarbon radicals and cyanoalkyl radicals, R is selected from the group consisting of monovalent hydrocarbon radicals, monovalent halohydrocarbon radicals and —CH₂CH₂OR″ radicals wherein R″ is an alkyl radical of from 1 to 6 inclusive carbon atoms, and n has a value of from 0 to 2 inclusive, and (b) liquid partial hydrolyzates of the above said silanes, and (3) an organic carbonyl compound selected from the group consisting of aldehydes and ketones.

3. The composition according to claim 2 wherein the organic radicals of (1) are monovalent hydrocarbon radicals.

4. A composition of matter consisting essentially of
(1) a hydroxyl-endblocked essentially diorganopolysiloxane having a viscosity of at least 500 cs. at 25° C. wherein the organic radicals attached thereto are selected from the group consisting of hydrogen atoms, monovalent hydrocarbon radicals, monovalent halohydrocarbon radicals and cyanoalkyl radicals,
(2) a silicate selected from the group consisting of
   (a) silanes of the formula $R'_nSi(OR)_{4-n}$ wherein $R'$ is selected from the group consisting of hydrogen atoms, monovalent hydrocarbon radicals, monovalent halohydrocarbon radicals and cyanoalkyl radicals, R is selected from the group consisting of monovalent hydrocarbon radicals, monovalent halohydrocarbon radicals and $$—CH_2CH_2OR''$$

radicals wherein $R''$ is an alkyl radical of from 1 to 6 carbon atoms inclusive, and $n$ has a value of from 0 to 2 inclusive, and
   (b) liquid partial hydrolyzates of the above said silanes,
(3) an organic carbonyl compound selected from the group consisting of aldehydes and ketones, and
(4) a filler.

5. The composition according to claim 4 wherein filler (4) is a silica.

6. A silicone rubber stock base consisting essentially of
(1) a siloxane in which the molecules are essentially of the formula

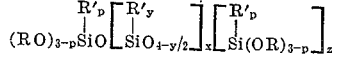

wherein R is selected from the group consisting of monovalent hydrocarbon radicals, monovalent halohydrocarbon radicals and $—CH_2CH_2OR''$ radicals wherein $R''$ is an alkyl radical of from 1 to 6 inclusive carbon atoms, $R'$ is selected from the group consisting of hydrogen atoms, monovalent hydrocarbon radicals, monovalent halohydrocarbon radicals and cyanoalkyl radicals, $x$ has an averge value at least 7, $p$ has an average value of from 0 to 1 inclusive, $y$ has an average value of up to 2 inclusive, $z$ has an average value of from 1 to 3 inclusive such that the sum of $y+z$ is 3, and
(2) an organic carbonyl compound selected from the group consisting of aldehydes and ketones.

7. The silicone rubber stock base according to claim 6 wherein $y$ has an average value of from 1.99 to 2 inclusive and $z$ has an average value of from 1 to 1.01 inclusive.

8. The silicone rubber stock base of claim 7, containing additionally (3) a filler.

9. The silicone rubber stock base of claim 8 wherein filler (3) is a silica.

10. A method which consists essentially of
(A) mixing
   (1) an organosilicon compound containing silicon-bonded hydroxyl radicals, there being in addition an average of up to 2.1 groups per silicon atom selected from the group consisting of hydrogen atoms, monovalent hydrocarbon radicals, monovalent halohydrocarbon radicals and cyanoalkyl radicals, the remaining valences of the silicon atoms being satisfied by selection from the group consisting of divalent oxygen atoms, divalent hydrocarbon radicals, divalent hydrocarbon ether radicals and haloarylene radicals, there being an average of at least two silicon-bonded hydroxyl radicals per molecule of (1),
   (2) an organosilicon compound containing an average of from one to four groups per silicon atom selected from the group consisting of —OR radicals and —R' substituents, wherein R is selected from the group consisting of monovalent hydrocarbon radicals, monovalent halohydrocarbon radicals and —$CH_2CH_2OR''$ radicals wherein $R''$ is an alkyl radical of from 1 to 6 inclusive carbon atoms, and R' is selected from the group consisting of hydrogen atoms, monovalent hydrocarbon radicals, monovalent halohydrocarbon radicals and cyanoalkyl radicals, there being present in organosilicon compound (2) an average of at least two —OR radicals per molecule, the remaining valences of the silicon atoms of the said organosilicon compound being satisfied by selection from the group consisting of divalent oxygen atoms, divalent hydrocarbon radicals, divalent hydrocarbon ether radicals and haloarylene radicals, and
   (3) an organic carbonyl compound selected from the groups consisting of aldehydes and ketones, and
(B) heating the said mixture at a temperature of at least 60° C. to cure the composition.

11. A method consisting essentially of
(A) mixing
   (1) a hydroxyl-endblocked essentially diorganopolysiloxane having a viscosity of at least 25 cs. at 25° C. wherein the organic radicals attached thereto are selected from the group consisting of hydrogen atoms, monovalent hydrocarbon radicals, monovalent halohydrocarbon radicals and cyanoalkyl radicals,
   (2) a silicate selected from the group consisting of
      (a) silanes of the formula $R'_nSi(OR)_{4-n}$, wherein $R'$ is selected from the group consisting of hydrogen atoms, monovalent hydrocarbon radicals, monovalent halohydrocarbon radicals and cyanoalkyl radicals, R is selected from the group consisting of monovalent hydrocarbon radicals, monovalent halohydrocarbon radicals and $$—CH_2CH_2OR''$$

radicals wherein $R''$ is an alkyl radical of from 1 to 6 inclusive carbon atoms, and $n$ has a value of from 0 to 2 inclusive, and
      (b) liquid partial hydrolyzates of the above said silanes, and
   (3) an organic carbonyl compound selected from the group consisting of aldehydes and ketones, and
(B) heating the mixture at a temperature of at least 60° C. to cure the composition.

12. The method of claim 11 wherein diorganopolysiloxane (1) has a viscosity of at least 500 cs. at 25° C., the organic radicals thereof being monovalent hydrocarbon radicals, and there is present in the mixture additionally (4) a filler.

13. The method of claim 12 wherein filler (4) is a silica.

14. A method which consists essentially of heating a mixture consisting essentially of
(1) a hydroxyl-endblocked essentially diorganopolysiloxane having a viscosity of at least 25 cs. at 25° C. wherein the organic substituents attached thereto are selected from the group consisting of hydrogen atoms, monovalent hydrocarbon radicals, monovalent halohydrocarbon radicals and cyanoalkyl radicals,
(2) a silicate selected from the group consisting of
   (a) silanes of the formula $R'_nSi(OR)_{4-n}$, wherein $R'$ is selected from the group consisting of hydrogen atoms, monovalent hydrocarbon radicals, monovalent halohydrocarbon radicals and cyanoalkyl radicals, R is selected from the group consisting of monovalent hydrocarbon radicals, monovalent halohydrocarbon radicals and —CH₂CH₂OR″ radicals wherein R″ is an alkyl radical of from 1 to 6 inclusive carbon atoms, and n has a value of from 0 to 2 inclusive, and (b) liquid partial hydrolyzates of the above said silanes, and (3) an organic carbonyl compound selected from the group consisting of aldehydes and ketones at a temperature of at least 60° C. to effect curing of the mixture.

15. The method of claim 14 wherein there is also present (4) a filler.

16. The method of claim 15 wherein filler (4) is a silica.

17. The method of claim 16 wherein the organic substituents of diorganopolysiloxane (1) are monovalent hydrocarbon radicals.

18. A method of curing an organosilicon composition consisting essentially of mixing (A) an organosilicon compound containing silicon-bonded hydroxyl radicals, there being in addition an average of up to 2.1 groups per silicon atom selected from the group consisting of hydrogen atoms, monovalent hydrocarbon radicals, monovalent halohydrocarbon radicals and cyanoalkyl radicals, the remaining valences of the silicon atoms being satisfied by selection from the group consisting of divalent oxygen atoms, divalent hydrocarbon radicals, divalent hydrocarbon ether radicals and haloarylene radicals, there being an average of at least two silicon-bonded hydroxyl radicals per molecule of (1) with a mixture (B) consisting essentially of (1) an organosilicon compound of the unit formula

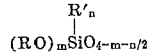

wherein R is selected from the group consisting of monovalent hydrocarbon radicals, monovalent halohydrocarbon radicals and

—CH₂CH₂OR″ radicals wherein R″ is an alkyl radical of from 1 to 6 inclusive carbon atoms, R′ is selected from the group consisting of hydrogen atoms, monovalent hydrocarbon radicals, monovalent halohydrocarbon radicals and cyanoalkyl radicals, $m$ has an average value per molecule of at least three, $n$ has an average value of up to two per silicon atom of (1), the sum of $m+n$ averaging up to 4 per silicon atom of (1), in which organosilicon compound any of the divalent siloxane oxygen atoms can be replaced by divalent radicals selected from the group consisting of divalent hydrocarbon radicals, divalent hydrocarbon ether radicals and haloarylene radicals, and (2) an organic carbonyl compound selected from the group consisting of aldehydes and ketones, and thereafter heating the combined materials at a temperature of at least 60° C. to cure the mixture.

19. A method of curing a polysiloxane consisting essentially of mixing (A) a hydroxyl endblocked essentially diorganopolysiloxane having a viscosity of at least 25 cs. at 25° C. wherein the organic radicals attached thereto are selected from the group consisting of hydrogen atoms, monovalent hydrocarbon radicals, monovalent halohydrocarbon radicals and cyanoalkyl radicals with a mixture (B) consisting essentially of (1) a silicate selected from the group consisting of (a) silanes of the formula R′ₙSi(OR)₄₋ₙ wherein R′ is selected from the group consisting of hydrogen atoms, monovalent hydrocarbon radicals, monovalent halohydrocarbon radicals and cyanoalkyl radicals, R is selected from the group consisting of monovalent hydrocarbon radicals, monovalent halohydrocarbon radicals and —CH₂CH₂OR″ radicals wherein R″ is an alkyl radical of from 1 to 6 inclusive carbon atoms, and n has a value of from 0 to 2 inclusive, and (b) liquid partial hydrolyzates of the above said silanes, and (2) an organic carbonyl compound selected from the group consisting of aldehydes and ketones, and thereafter heating the combined materials at a temperature of at least 60° C. to cure the mixture.

20. A method of curing a polysiloxane consisting essentially of mixing (A) (1) a hydroxyl endblocked essentially diorganopolysiloxane having a viscosity of at least 500 cs. at 25° C. wherein the organic radicals attached thereto are selected from the group consisting of hydrogen atoms, monovalent hydrocarbon radicals, monovalent halohydrocarbon radicals and cyanoalkyl radicals, and (2) a filler
with a mixture (B) consisting essentially of (3) a silicate selected from the group consisting of (a) silanes of the formula R′ₙSi(OR)₄₋ₙ wherein R′ is selected from the group consisting of hydrogen atoms, monovalent hydrocarbon radicals, monovalent halohydrocarbon radicals and cyanoalkyl radicals, R is selected from the group consisting of monovalent hydrocarbon radicals, monovalent halohydrocarbon radicals and —CH₂CH₂OR″ radicals wherein R″ is an alkyl radical of from 1 to 6 inclusive carbon atoms, and n has a value of from 0 to 2 inclusive, and (b) liquid partial hydrolyzates of the above said silanes, and (4) an organic carbonyl compound selected from the group consisting of aldehydes and ketones, and thereafter heating the combined materials at a temperature of at least 60° C. to cure the mixture.

21. The method of claim 20 wherein filler (2) is a silica.

22. The composition of matter according to claim 1 wherein (3) is an aldehyde.

23. The composition of matter according to claim 22 wherein (3) is heptaldehyde.

24. The composition of matter according to claim 22 wherein (3) is benzaldehyde.

25. The composition of matter according to claim 22 wherein (3) is C₆H₅(SH₃)₂SiC₆H₄CHO.

26. The composition of matter according to claim 1 wherein (3) is a ketone.

27. The composition of matter according to claim 26 wherein (3) is methylisobutylketone.

28. The composition of matter according to claim 26 wherein (3) is acetophenone.

29. The composition of matter according to claim 26 wherein (3) is

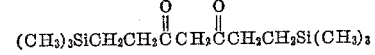

30. The composition of matter according to claim 2 wherein (3) is an aldehyde.

31. A composition of matter consisting essentially of (1) an organosilicon compound containing silicon-bonded hydroxyl radicals, there being in addition an average of up to 2.1 substituents per silicon atom selected from the group consisting of hydrogen atoms, monovalent hydrocarbon radicals, monovalent halohydrocarbon radicals and cyanoalkyl radicals, the remaining valences of the silicon atoms being satisfied by selection from the group consisting of divalent oxygen atoms, divalent hydrocarbon radicals, divalent hydrocarbon ether radicals and divalent haloarylene radicals, there being an average of at least two silicon-bonded hydroxyl radicals per molecule of (1), (2) an organosilicon compound containing an average of from 1 to 4 groups per silicon atom selected from the group consisting of —OR radicals and —R′ substituents wherein R is selected from the group consisting of monovalent hydrocarbon radicals, monovalent halohydrocarbon radicals and —CH$_2$CH$_2$OR″ radicals wherein R″ is an alkyl radical of from 1 to 6 inclusive carbon atoms and R′ is selected from the group consisting of hydrogen atoms, monovalent hydrocarbon radicals, monovalent halohydrocarbon radicals and cyanoalkyl radicals, there being present in organosilicon compound (2) an average of at least two —OR radicals per molecule, the remaining valences of the silicon atoms of said organosilicon compound being satisfied by selection from the group consisting of divalent oxygen atoms, divalent hydrocarbon radicals, divalent hydrocarbon ether radicals and divalent haloarylene radicals, and (3) a compound which liberates an aldehyde upon heating.

32. The composition of matter according to claim 31 wherein (3) is trioxane.

33. The composition of matter according to claim 31 wherein (3) is a polyoxymethylene.

34. A composition of matter consisting essentially of (1) a hydroxyl endblocked essentially diorganopolysiloxane having a viscosity of at least 25 cs. at 25° C. wherein the organic radicals attached thereto are selected from the group consisting of hydrogen atoms, monovalent hydrocarbon radicals, monovalent halohydrocarbon radicals and cyanoalkyl radicals, (2) a silicate selected from the group consisting of (a) silanes of the formula $$R′_nSi(OR)_{4-n}$$

wherein R′ is selected from the group consisting of hydrogen atoms, monovalent hydrocarbon radicals, monovalent halohydrocarbon radicals and cyanoalkyl radicals, R is selected from the group consisting of monovalent hydrocarbon radicals, monovalent halohydrocarbon radicals and —CH$_2$CH$_2$OR″ radicals wherein R″ is an alkyl radical of from 1 to 66 inclusive carbon atoms, and $n$ has a value of from 0 to 2 inclusive, and (b) liquid partial hydrolyzates of the defined silanes, and (3) a compound which liberates an aldehyde upon heating.

35. The composition of matter according to claim 34 wherein (3) is paraldehyde.

36. The composition of matter according to claim 34 wherein (3) is trioxane.

37. The composition of matter according to claim 4 wherein (2) is camphor and heptaldehyde.

38. The silicone rubber stock base according to claim 6 wherein (2) is an aldehyde.

39. A silicone rubber stock base consisting essentially of
(1) a siloxane in which the molecules are essentially of the formula

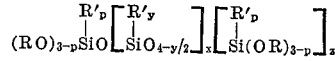

wherein R is selected from the group consisting of monovalent hydrocarbon radicals, monovalent halohydrocarbon radicals and —CH$_2$CH$_2$OR″ radicals wherein R″ is an alkyl radical of from 1 to 6 inclusive carbon atoms, R′ is selected from the group consisting of hydrogen atoms, monovalent hydrocarbon radicals, monovalent halohydrocarbon radicals and cyanoalkyl radicals, $x$ has an average value at least 7, $p$ has an average value of from 0 to 1 inclusive, $y$ has an average value of up to 2 inclusive, $z$ has an average value of from 1 to 3 inclusive such that the sum of $y+z$ is 3, and
(2) a compound which liberates an aldehyde upon heating.

References Cited
UNITED STATES PATENTS

| | | | |
|---|---|---|---|
| 2,390,378 | 12/1945 | Marsden | 260—448.2 |
| 2,555,489 | 6/1951 | Hirsch | 260—448.8 |
| 2,666,041 | 1/1954 | Pfeifer | 260—46.5 XR |
| 2,843,555 | 7/1958 | Berridge. | |
| 2,909,552 | 10/1959 | Chevalier | 260—448.2 |
| 3,065,194 | 11/1962 | Nitzsche et al. | 260—448.2 |
| 3,110,689 | 11/1963 | Smith | 260—46.5 XR |
| 3,113,881 | 12/1963 | Spurgeon et al. | 260—46.5 XR |

OTHER REFERENCES

M. M. Sprung and F. O. Guenther, Journal of American Chemical Soc., 77ne22, pp. 6045–47, November 1955.

Chemical Abs., vol. 50, col. 2418, 1956. Hydrolysis of difunctional organo silicon monomers. K. A. Andrianov and N. N. Sokolov. Doklady Academy Nauk S.S.S.R. 101, 81–4, (1955).

K. A. Andrianov, Polymers With Inorganic Main Chains of Molecules, Institute of Organo Metalic Compounds, Acadamy of Sciences, USSR, 1962; English translation JPRS; 20, 272; TT: 63–3134, July 22, 1963, U.S. Department of Commerce. Clearing House, pp. 260, 275–77.

JULIUS FROME, *Primary Examiner.*

A. H. KOECKERT, J. E. CALLAGHAN,
*Assistant Examiners.*